US008798972B2

(12) United States Patent
English et al.

(10) Patent No.: US 8,798,972 B2
(45) Date of Patent: Aug. 5, 2014

(54) APPARATUS AND METHOD FOR VIRTUAL ASSEMBLY, INTEGRATION AND TESTING OF AN INTEGRATED SYSTEM

(75) Inventors: Kent L. English, St. Charles, MO (US); Bryan G. Dods, Ballwin, MO (US); Lisa Marie Phelps, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 1574 days.

(21) Appl. No.: 12/147,161

(22) Filed: Jun. 26, 2008

(65) Prior Publication Data

US 2009/0326904 A1 Dec. 31, 2009

(51) Int. Cl.
*G06G 7/48* (2006.01)
*G06F 17/50* (2006.01)
*G06F 9/46* (2006.01)
*G06F 11/22* (2006.01)
*G06F 11/26* (2006.01)

(52) U.S. Cl.
CPC .............. *G06F 11/261* (2013.01); *G06F 17/50* (2013.01); *G06F 9/46* (2013.01); *G06F 11/2273* (2013.01); *G06F 17/5095* (2013.01); *G06F 17/5009* (2013.01); *G06F 2217/04* (2013.01)
USPC ................................................ 703/6; 703/16

(58) Field of Classification Search
CPC . G06F 17/50; G06F 17/5009; G06F 11/2273; G06F 9/46
USPC .................................................. 703/6, 13, 16
See application file for complete search history.

(56) References Cited

U.S. PATENT DOCUMENTS

| 6,792,396 | B2* | 9/2004 | Inda et al. ..................... 702/188 |
| 7,092,867 | B2* | 8/2006 | Huang et al. ..................... 703/21 |
| 7,642,989 | B2* | 1/2010 | Cheong et al. ................. 345/2.1 |
| 2005/0209829 | A1* | 9/2005 | Binzer et al. ....................... 703/1 |
| 2005/0278670 | A1* | 12/2005 | Brooks et al. ..................... 716/5 |
| 2007/0260438 | A1* | 11/2007 | Langer et al. ..................... 703/8 |
| 2008/0262816 | A1* | 10/2008 | Lontka ............................ 703/13 |
| 2009/0099824 | A1* | 4/2009 | Falash et al. ..................... 703/8 |

OTHER PUBLICATIONS

Deepak Shankar, "Using Virtual system prototyping to evaluate VME hardware platformralternatives", EETimes, May 15, 2007.*

(Continued)

*Primary Examiner* — Thai Phan
*Assistant Examiner* — Angel Calle
(74) *Attorney, Agent, or Firm* — Charles L. Moore; Moore & Van Allen PLLC

(57) ABSTRACT

An apparatus for testing a subsystem of a plurality of subsystems capable of being assembled to form an integrated system may include an integration stand for testing the subsystem without actual physical assembly of the plurality of subsystems which form the integrated system. The integration stand may include an interface to connect the subsystem to the integration stand for testing. The integration stand may also include a network device for connecting the integration stand to a communications network for communications between the subsystem and any other subsystems of the plurality of subsystems available via the network. In this way, the subsystem and the other subsystems may be virtually assembled and integrated to virtually form the integrated system for interoperability of the subsystems and testing without actual physical assembly of the plurality of subsystems. The integration stand may also include a simulation unit to simulate any other subsystems forming the integrated system, which are unavailable via the communications network, to virtually form the integrated system for testing the subsystem connected to the interface of the integration stand.

21 Claims, 2 Drawing Sheets

(56) References Cited

OTHER PUBLICATIONS

Simulation Interoperability Standards Organization Product Development Group (PDG), Simulation Interoperability Standards Organization (SISO), Mar. 2007.*

Hauke Fuhrmann and Jens Koch, "The Aerospace Demonstrator of DECOS", 2005.*

* cited by examiner

APPARATUS AND METHOD FOR VIRTUAL ASSEMBLY, INTEGRATION AND TESTING OF AN INTEGRATED SYSTEM

FIELD

The present invention relates to testing systems and different subsystems that form the systems, and more particularly to an apparatus and method for virtual assembly, integration and testing of an integrated system by permitting virtual assembly and integration of multiple subsystems forming the integrated system where each of the multiple subsystems may be individually designed, assembled and tested at different geographic locations.

BACKGROUND OF THE INVENTION

Complex, integrated systems, such as aerospace vehicles, aircraft or other large vehicles or systems, may include multiple subsystems, assemblies, and components. Each of these subsystems may be designed and developed by different suppliers or vendors or for some other reason may be designed and developed in different geographical locations. Because the different subsystems or components may be geographically distributed, the subsystems or components are then designed and tested separately from the other subsystems or components. The separate design and testing can result in possible incompatibility issues during final assembly and integration of the subsystems to actually form the integrated system. Responsibility for testing rests with each individual supplier and is performed in accordance with specifications provided by the large system integrator. Any existing test equipment is usually tailored to the particular subsystems. This does not expose interoperability and performance issues across subsystem boundaries. Simulations can be used to emulate missing subsystem functionality and performance; however, such simulations may be limited in scope.

BRIEF SUMMARY OF THE INVENTION

In accordance with an embodiment of the present invention, a system and method is provided that allows geographically distributed subsystems of a larger, integrated system to be designed, virtually integrated, assembled and tested without actual physical assembly of the subsystems. The system and method allows for the subsystems to be virtually integrated into a single virtual system for interoperability and testing using a plurality of geographically distributed integration stands, each integration stand being associated with a subsystem. The integration stands may be connected together over a communications network, such as the Internet or other network, using virtual private networks or similar secure or private networks.

In accordance with another embodiment of the present invention, an apparatus for testing a subsystem of a plurality of subsystems capable of being assembled to form an integrated system may include an integration stand for testing the subsystem without actual physical assembly of the plurality of subsystems which form the integrated system. The integration stand may include an interface to connect the subsystem to the integration stand for testing. The integration stand may also include a network device for connecting the integration stand to a communications network for communications between the subsystem and any other subsystems of the plurality of subsystems available via the network. In this way, the subsystem and the other subsystems may be virtually assembled and integrated to virtually form the integrated system for interoperability of the subsystems and testing without actual physical assembly of the plurality of subsystems. The integration stand may also include a simulation unit to simulate any other subsystems forming the integrated system, which are unavailable via the communications network, to virtually form the integrated system for testing the subsystem connected to the interface of the integration stand.

In accordance with another embodiment of the present invention, a system is provided for concurrently testing a plurality of subsystems for forming an integrated system without actual physical assembly of the integrated system. The system may include a plurality of geographically distributed integration stands. Each integration stand is for testing an associated subsystem without requiring actual physical assembly of the plurality of subsystems. Each integration stand may include an interface to connect the associated subsystem to the integration stand for testing. A network device may connect the integration stand to a communications network for communications between the subsystem and any other subsystems of the plurality of subsystems available via the network. Accordingly, the subsystem and the other available subsystems may be virtually assembled and integrated to virtually form the integrated system for interoperability of the subsystems and testing without actual physical assembly of the plurality of subsystems. A simulation unit may simulate any other subsystems forming the integrated system, which are not available via the communications network, to virtually form the integrated system for testing the subsystem connected to the interface of the integration stand. The system may also include a central station for overall control and coordination of each of the integration stands.

In accordance with another embodiment of the present invention, a method for testing a subsystem of a plurality of subsystems capable of being assembled to form an integrated system may include enabling connection of the subsystem under test to a communications network for communications between the subsystem under test and any other subsystems of the plurality of subsystems available via the network to virtually assemble and integrate the subsystem and the other available subsystems to virtually form the integrated system for interoperability of the subsystems and testing without actual physical assembly of the plurality of subsystems. The method may also include simulating any other subsystems forming the integrated system, which are not available via the communications network, to virtually form the integrated system for testing the subsystem.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system."

Figure 1:
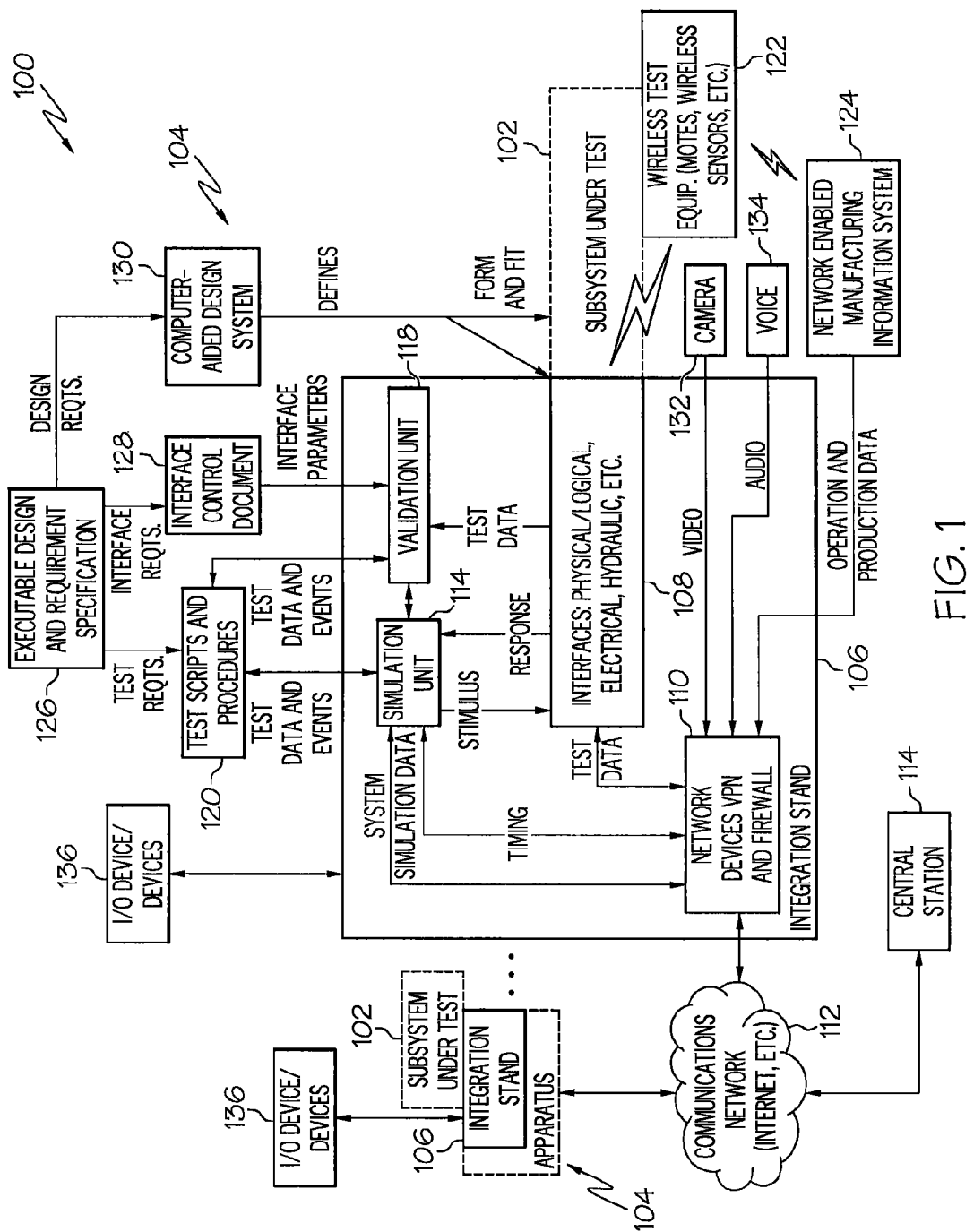
FIG. 1 is a block schematic diagram of an example of a system for testing a plurality of subsystems for forming an integrated system without actual physical assembly of the integrated system in accordance with an embodiment of the present invention.

FIG. 1 is a block schematic diagram of an example of a system 100 for testing a plurality of subsystems 102 for forming an integrated system (not shown in the drawings) without actual physical assembly of the integrated system in accordance with an embodiment of the present invention. The system 100 may include a plurality of apparatus 104. Each apparatus 104 may include an integration stand 106. Each subsystem 102 may be designed and developed by a different supplier or vendor. The different suppliers and vendors may be located in different geographical areas. Accordingly, the apparatuses 104 and associated integration stands 106 may be geographically distributed. Such design and development scenarios are not unusual for large integrated systems including multiple subsystems, assemblies, and components, such as aerospace vehicles, aircraft or other large integrated systems.

Each integration stand 106 may include an interface 108 to connect the subsystem 102 to the integration stand for testing purposes or other purposes. The interface 108 may include all mating connectors or devices to physically and logically connect the subsystem 102 under test to the integration stand 106. Accordingly, the interface 108 may include all electrical, hydraulic or other connectors or devices to physically and logically connect the subsystem 102 to the integration stand 106. Thus, the interface 108 permits operational and testing data to be transmitted to and received from other integration stands 106 for either independent or concurrent testing of other subsystems 102 associated with other integration stands 106.

Each integration stand 106 may also include a network device 110 for connecting the integration stand 106 to a communications network 112. The communications network 112 may be the Internet, an intranet or other private network. As an example, the network device 110 or devices may include equipment to form a virtual private network between the integration stands 106 and a firewall for secure communications over the Internet. The network devices 110 may also include equipment to meet bandwidth and latency requirements to provide substantially non-intrusive performance between the different subsystems 102 available via the communications network 112 to virtually form the integrated system for interoperability of the subsystems 102 and testing without actual physical assembly of the subsystems 102.

The integration stand 106 may also include a simulation unit 114. The simulation unit 114 may simulate or emulate any other subsystems 102 forming the integrated system, which are not available via the communications network 112, to virtually form the integrated system for testing the subsystem 102 connected to the interface 108. The simulation unit 114 can generate stimulus and transmit the stimulus to the interface 108 to be applied to the subsystem 102. The simulation unit 114 may then receive any responses generated by the subsystem 102 via the interface 108.

The simulation unit 114 may be selected by a user to operate in a stand-alone mode or in a system mode. In the stand-alone mode, the integration stand 106 may function as autonomous test equipment used for testing only the subsystem 102 connected to the integration 106. In the system mode, the simulation unit 114 may work in tandem with any actual performance data from other integration stands 106 to perform system testing. As previously discussed, the simulation unit 114 may simulate any other subsystems 106 which may not be available via the communications network 112. The simulation unit 114 may operate via the subsystem interface 108 or interfaces to non-intrusively emulate any missing subsystems 106 or other components. In the system mode, simulation functionality may be minimized since test data from other subsystems 106 may be supplied via the communications network 112 from any available subsystems 106. The simulation unit 114 may provide stimulus in order to satisfy a tight closed-loop command/response whereas the latency over the communication network 112 is too great. Additionally, the simulation unit 114 may validate the communication network response to validate that the correct response was either provided by the simulation or by the communication network 112 from other subsystems. Any variance outside a tolerance window would be flagged as an unacceptable response. Communication network latency would be constantly measured to insure timing parameters are met.

A common time reference may be supplied to each integration stand 106 to insure all available subsystems 106 are operating in the same temporal space and timing and performance data can be collected. The common time reference may be supplied by a central station 116. The central station 116 will be described in more detail below. In situations where control and feedback loops cannot be non-intrusive due to any latency of the network 112, the simulation unit 114 may provide any necessary responses.

The integration stand 106 may also include a validation unit 118 to verify interface interoperability and performance requirements of the subsystem 118. The validation unit 118 may be customized by either the simulation unit 114 and/or test scripts from a test scripts and procedures database 120. The validation unit 118 is able to receive information from the subsystem 102 under test and/or wireless testing equipment 122 to verify that any measurements from the subsystem 102 are within tolerances of design, interface and performance requirements. The validation unit 118 may log the expected results or data with measured results or data from the subsystem 102 or wireless testing equipment 122.

The wireless testing equipment 122 may include but is not limited to sensor motes, wireless communication equipment, and sensor networks. Wireless motes may be wireless microelectromechanical systems (MEMS) sensors, robots, or devices installed with wireless communications, that can detect selected parameters, such as light, temperature, vibration or other parameters, and transmit the detected parameters to a predetermined receiver. Accordingly, the wireless testing equipment may include sensors to sense predetermined parameters related to operation of the subsystem 102 under test. The wireless test equipment 122 may allow seamless and transparent communication to virtual test equipment or the integration stand 106 in support of moving or pulse production lines. The wireless testing equipment 122 may collect sensor readings and provide the information back to a network enabled manufacturing system 124 and/or the simulation unit 114 or validation unit 118. The network enabled manufacturing information system 124 may assimilate the sensor readings and data for further analysis and evaluation. The network enabled manufacturing information system 124 may transmit operation and production data to the integration stand 106 or to the network device 110 for communication to other integration stands 106 or to the central station 114.

An executable design and requirements specification 126 may provide or define test requirements for the test scripts and procedures 120. The test scripts and procedures 120 may then provide test data and events for operation of the simulation unit 114 and the validation unit 118. The validation unit 118 may also receive interface parameters form an interface control document 128. The interface control document 128 may be defined by interface requirements from the executable design and requirements specification 126.

The executable design and requirements specification 126 may also provide design requirements to a computer-aided design system 130. The computer-aided design system 130 may define the interface 108 for connecting the subsystem 102 to the integration stand 106. The computer-aided design system 130 may also define the fit and form of the subsystem 102.

The apparatus 104 may also include a camera 132 and voice or audio function 134 to collect data related to operation of the subsystem 102 under test. The camera 132 and audio function 134 may be built into a common device, such as a video camera or similar device. The camera 132 and voice or audio function 134 may be coupled to the integration stand 106 or to the network devices 110 of the integration stand 106 for transmission of video and audio signals via the communications network 112. The video and audio signals may be transmitted via the network 112 to other integration stands 106 or to the central station 114.

The apparatus 100 may also include an input device, output device or combination input and output devices, I/O device 136. The I/O device or devices 136 may provide a user interface for control of the operation of the integration stand 106. Examples of the I/O device or devices 136 may include a keyboard, display, mouse, magnetic, optical or other drive, or similar devices to permit a user to control operation of the integration stand 106 including programming the operation of elements of the integration stand 106, such as the simulation unit 114 and validation unit 118.

As previously described, the system 100 may also include a central station 116. The central station 116 may communicate with the integration stations 106 and the associated subsystems 102 via the communications network 112. The central station 116 may provide overall control of the integration stations 106. The central station 116 may be associated with a system integrator to provide overall control of the interoperability and testing of the various subsystems 106 and to provide centralized reporting and analysis of results.

Figure 2:
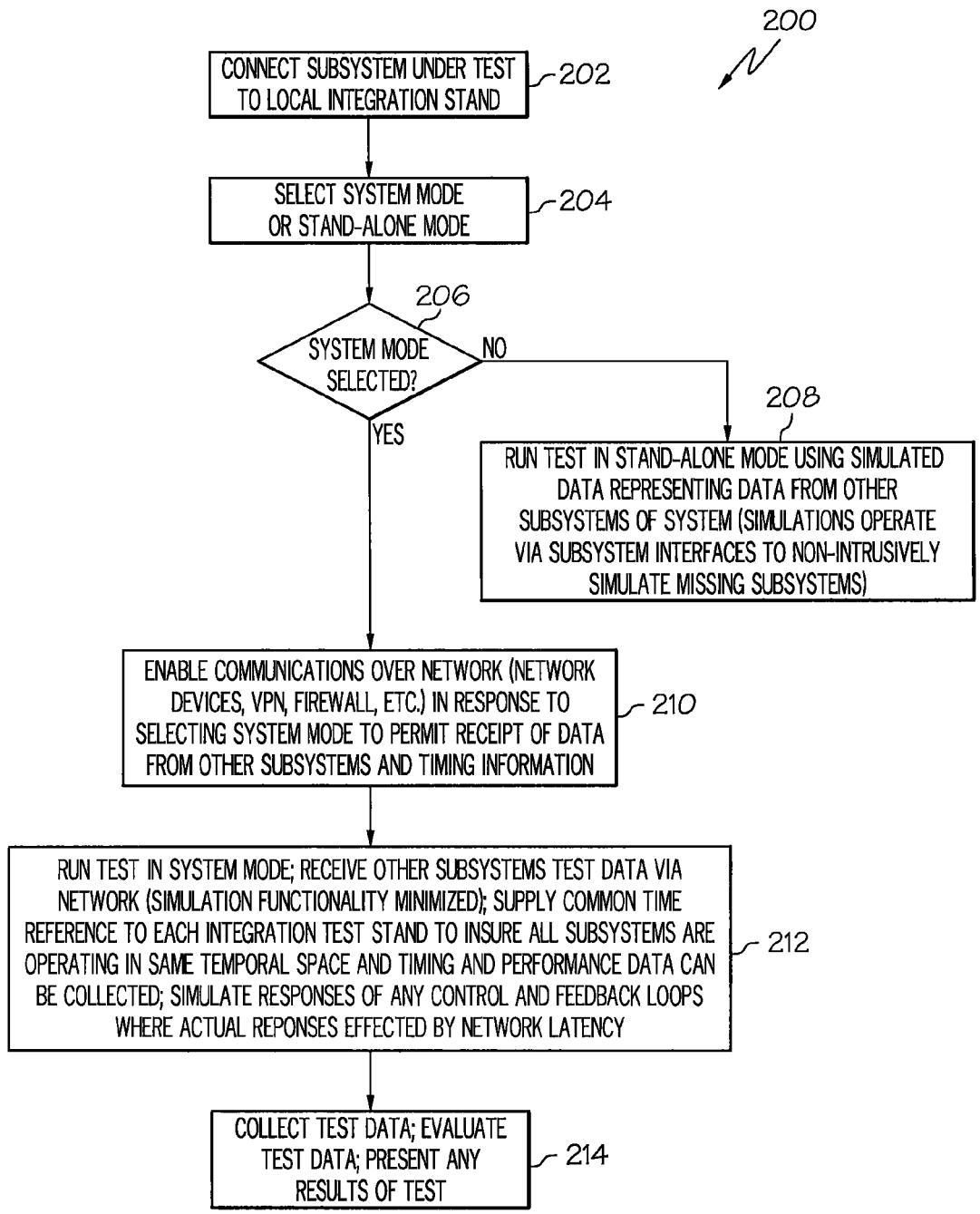
FIG. 2 is a flow chart of an example of a method for virtual assembly, integration and testing of subsystems of an integrated system in accordance with an embodiment of the present invention.

FIG. 2 is a flow chart of an example of a method 200 for virtual assembly, integration and testing of subsystems of an integrated system in accordance with an embodiment of the present invention. The method 200 may be performed by the system 100 of FIG. 1 and may be embodied therein.

In block 202, a subsystem to be tested may be connected to a local integration stand similar to integration stand 106 of FIG. 1. In block 204, a system mode or a stand-alone mode may be selected by a user. In block 206, a determination may be made whether the system mode or the stand-along mode was selected. The method 200 may advance to block 208 in response to the stand-alone mode being selected. In block 208, tests of the subsystem may be run in the stand-alone mode using simulated data representing data from other subsystems to effectively virtually assemble the subsystems to form the integrated system without actually physically assembling the subsystems. The simulations of the other subsystems may operate via subsystem interfaces, such as interface 108 in FIG. 1 to non-intrusively simulate any missing subsystems or components.

If the mode selected is the system mode in block 206, the method 200 may advance to block 210. In block 210, communications over a communications network may be enabled in response to selection of the system mode to permit receipt of data from other subsystems and timing information. The communications network may be similar to communications network 112 described with reference to FIG. 1.

In block 212, test of the subsystem may be run in the system mode. Test data from other subsystems may be received via the communications network similar to that previously described. Simulation data for any subsystems which are not available via the communications network may be generated such that the integrated system can be virtually assembled and tested along with each the available subsystems interconnected via the communications network. Accordingly, simulation functionality of missing subsystems may be minimized by using actual performance data from other subsystems. The other subsystems may also be tested concurrently or may just be providing data for testing of a particular subsystem under test.

In block 212, a common time reference may be supplied to each integration stand to insure all subsystems are operating in the same temporal space and timing and performance data can be collected. Responses of any control and feedback loops may be simulated where actual responses may be affected by network latency.

In block 214, the test data may be collected, evaluated and the test results presented. Similar to that previously described, a central station may collect the test data from all of the integrated test stands and evaluate and present the test results. The results may be presented on an output device, such as a display or printer.

The flowcharts and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An apparatus for testing a subsystem of a plurality of subsystems for assembly to form an integrated system, the apparatus comprising:
   a plurality of integration stands, each integration stand of the plurality of integration stands for testing at least one of the plurality of subsystems without actual physical assembly of the plurality of subsystems which form the integrated system, each integration stand of the plurality of integration stands comprising:
   an interface to connect the subsystem to the integration stand for testing;
   a network device for connecting the integration stand to a communications network for communications between the subsystem and at least one available subsystem of the plurality of subsystems that is available via the network to virtually assemble and integrate the subsystem and the at least one available subsystem to virtually form the integrated system for interoperability of the subsystems and testing without actual physical assembly of the plurality of subsystems; and
   a simulation unit, the simulation unit simulating at least one unavailable subsystem forming the integrated system to virtually form the integrated system for testing the subsystem connected to the interface of the integration stand in response to the at least one unavailable subsystem not being available via the communications network.

2. The apparatus of claim 1, wherein each integration stand further comprises a validation unit to verify interface interoperability and performance requirements of the subsystem.

3. The apparatus of claim 2, further comprising a test scripts and procedures database to provide test data and events data to the simulation unit for simulating other subsystems forming the integrated system during testing of the subsystem connected to the interface of the integration stand.

4. The apparatus of claim 3, wherein the validation unit receives the test data from the subsystem under test and verifies that the test data is within predetermined design, interface and performance tolerances for the subsystem under test.

5. The apparatus of claim 3, wherein the validation unit is customizable by at least one of the simulation unit and the test scripts from the test scripts and procedures database.

6. The apparatus of claim 3, further comprising an interface control document to provide interface parameters to the validation unit to verify interface interoperability.

7. The apparatus of claim 1, further comprising wireless test equipment including sensors to sense predetermined parameters related to operation of the subsystem under test, the wireless test equipment being coupled to the subsystem under test to permit sensor data to be transmitted wirelessly to the integration stand.

8. The apparatus of claim 7, further comprising a network enabled manufacturing information system to receive sensor data from the wireless test equipment and to transmit the sensor data to the integration stand.

9. The apparatus of claim 1, wherein the simulation unit comprises:
   a stand-alone mode of operation for autonomously testing the subsystem; and
   a system mode of operation to use test data from other subsystems received via the communications network and to simulate any other subsystems forming the integrated system which are unavailable to provide test data via the communications network.

10. The apparatus of claim 1, wherein each integration stand receives a common time reference to insure all subsystems communicating via the communications network are operating in a common timing for interoperability and testing.

11. The apparatus of claim 1, wherein the simulation unit compensates for any control and feedback loops being affected by latency of the communications network.

12. The apparatus of claim 1, wherein the simulation unit generates any responses from other subsystems in response to any control and feedback loops being affected by latency of the communications network.

13. The apparatus of claim 1, wherein the interface comprises electrical and hydraulic connectors to physically and logically connect the subsystem to the integration stand.

14. A system for concurrently testing a plurality of subsystems for forming an integrated system without actual physical assembly of the integrated system, the system comprising:
   a plurality of geographically distributed integration stands, each integration stand of the plurality of integration stands for testing an associated subsystem without requiring actual physical assembly of the plurality of subsystems, each integration stand comprising:
   an interface to connect the associated subsystem to the integration stand for testing;
   a network device for connecting the integration stand to a communications network for communications between the subsystem and at least one available subsystem of the plurality of subsystems that is available via the network to virtually assemble and integrate the subsystem and the at least one available subsystem to virtually form the integrated system for interoperability of the subsystems and testing without actual physical assembly of the plurality of subsystems; and
   a simulation unit, the simulation unit simulating at least one unavailable subsystem forming the integrated system to virtually form the integrated system for testing the subsystem connected to the interface of the integration stand in response to the at least one unavailable subsystem not being available via the communications network; and
   a central station for overall control and coordination of each of the integration stands.

15. The system of claim 14, wherein each integration stand further comprises a validation unit to verify interface interoperability and performance requirements of the associated subsystem, wherein the validation unit receives test data from the associated subsystem under test and verifies that the test data is within predetermined design, interface and performance tolerances for the subsystem under test.

16. The system of claim 15, further comprising a test scripts and procedures database associated with each integration stand to provide test data and events data to the simulation unit of each integration stand for simulating other subsystems forming the integrated system which are not available via the network during testing, and wherein the validation unit is customizable by at least one of the simulation unit and test scripts from the test scripts and procedures database.

17. A method for testing a subsystem of a plurality of subsystems for assembly to form an integrated system, the method comprising:
- enabling connection of the subsystem under test to a communications network for communications between the subsystem under test and any other subsystems of the plurality of subsystems available via the network to virtually assemble and integrate the subsystem and the other available subsystems to virtually form the integrated system for interoperability of the subsystems and testing without actual physical assembly of the plurality of subsystems, wherein the integrated system comprises a vehicle; and
- simulating at least one unavailable subsystem forming the integrated system to virtually form the integrated system for testing the subsystem in response to the at least one unavailable subsystem not being available via the communications network, wherein each subsystem is connected to one of a plurality, of integration stands, each integration stand comprising a simulation unit for simulating the at least one unavailable subsystem in response to the at least one unavailable subsystem not be being available via the communications network.

18. The method of claim 17, further comprising verifying interface operability and performance requirements of the subsystem under test.

19. The method of claim 17, further comprising:
- enabling operation in one of a stand-alone mode and a system mode to test the subsystem;
- generating data to simulate data from the other subsystems during operation of the integrated system in the stand-alone mode;
- inputting the simulated data to an interface connecting the subsystem under test to virtually assemble and integrate the subsystem under test and the other subsystems without actual physical assembly of the plurality of subsystems to virtually form the integrated system in response to operation in the stand-alone mode to test the subsystem; and
- enabling communication over the communications network in response to operation in the system mode to permit receipt of actual testing data from other subsystems at different geographic locations and simulating testing data for any other subsystems that are not available via the communications network to virtually assemble and integrate the subsystem under test and the other subsystems without actual physical assembly of the plurality of subsystems to virtually form the integrated system for interoperability and testing.

20. The method of claim 17, further comprising generating a common time reference to insure that all subsystems communicating via the communications network are operating in a common temporal space and timing for testing at least the subsystem under test.

21. The method of claim 20, further comprising compensating for any latency of the communications network.

* * * * *